UNITED STATES PATENT OFFICE 2,364,145

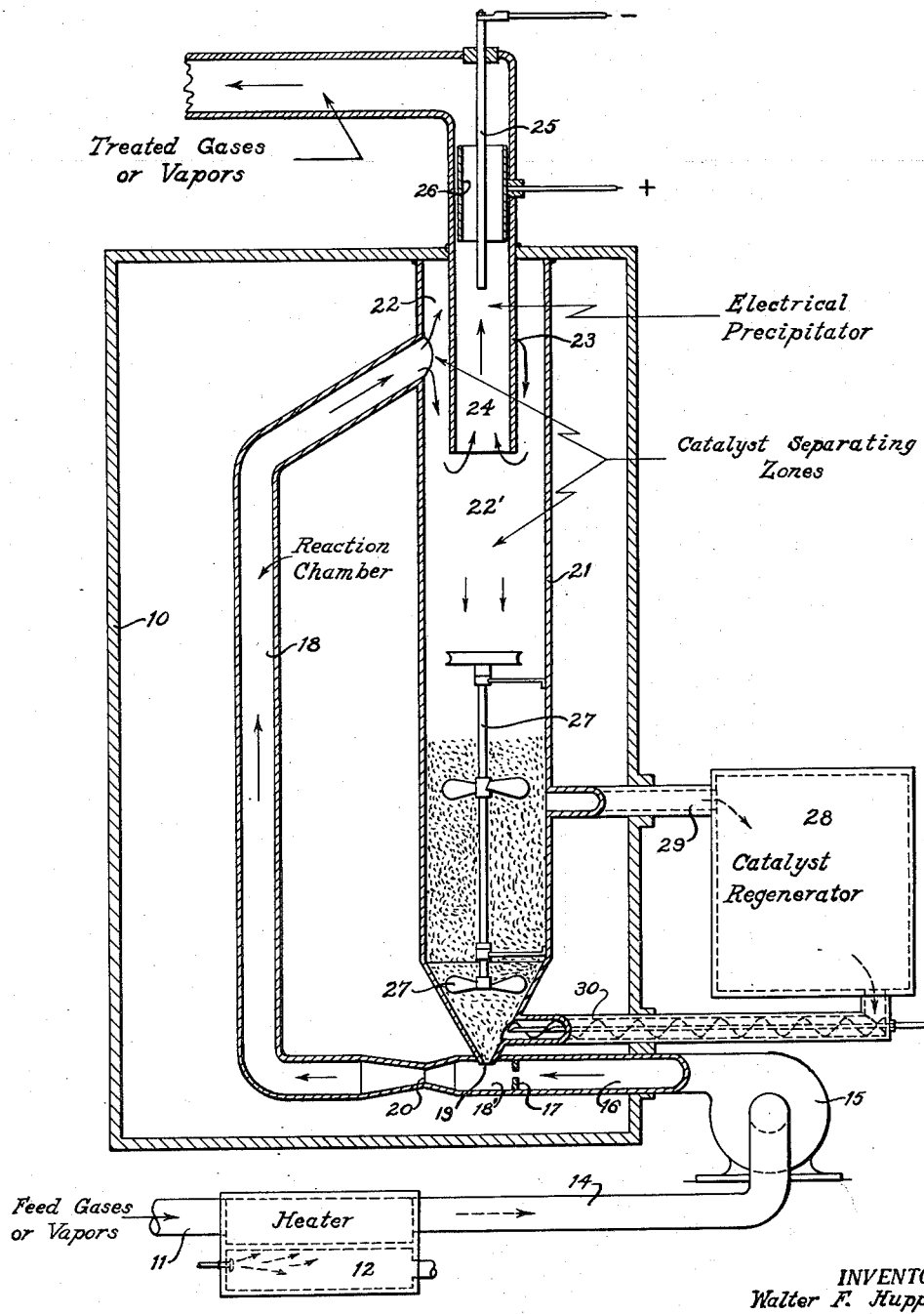

CATALYTIC METHOD

Walter F. Huppke, Lomita, and Theodore Vermeulen, Los Angeles, Calif., assignors to Union Oil Company of California, Los Angeles, Calif., a corporation of California Application February 12, 1940, Serial No. 318,414

3 Claims. (Cl. 23—1)

This invention relates particularly to the treatment of various materials with catalysts to effect chemical reaction, such as cracking, hydrogenation, dehydrogenation, polymerization and like modifications of hydrocarbons, both liquids and gases and including the paraffinic, naphthenic and kindred classifications.

The principal object of the invention is to provide a means for effecting superior contact between catalysts and the materials upon which they are intended to act. In ordinary practices, the catalytic treatment of gases, for example, as in the case of the dehydrogenation of petroleum or other hydrocarbon gases, has been effected by passing the gas or vapor over a catalyst contained in a reaction tube or chamber in granular form.

We have found, however, that the catalytic effects may be greatly improved and the life of the catalyst may be prolonged materially by effecting a contact of the catalyst in very finely divided form as distinguished from the usual granular form.

The present invention, therefore, resides in effecting catalytic contacts by producing a suspension of the catalyst in a very finely powdered form in the presence of gases or vapors upon which the catalyst is to operate. More particularly, the finely powdered catalyst is circulated with gases at the desired reaction temperature at a velocity sufficient to keep the catalyst in turbulence and in suspension in the gases or vapors being treated until the conversion sought has been accomplished.

However, a major difficulty in the use of powdered catalysts has been the tendency of the finely ground particles of the catalyst to cohere and form agglomerates which are too heavy to be retained in suspension in the stream of the reacting gas or vapor. The agglomeration of the finely ground particles of the catalyst usually results during the mechanical handling of the finely powdered catalyst, such as in the feed devices employed to introduce the catalyst into the stream of gas. In fact, the least agitation of the catalyst tends to ball the ground particles of the catalysts into agglomerates which are too heavy to be retained in suspension in the gas or vapor to be treated. Also, this agglomeration occurs in the device employed to separate the treated vapor or gas from the catalyst after the reaction has been effected and it is desired to recirculate the catalyst to fresh gas to be treated. Such separating devices may include an electric precipitator of the Cottrell type.

We have discovered that the agglomerated particles of the finely divided catalyst may be broken up and dispersed in the gas or vapor to be treated in a very fine state of subdivision, such as the original fineness of the catalyst when produced by grinding, by subjecting the agglomerates of the finely ground catalyst to the action of an extremely high velocity jet of gas or vapor such as the gas or vapor to be treated.

We have discovered that when the agglomerated particles of the finely ground catalyst are contacted with the gas or vapor to be treated while traveling at a linear velocity greater than that of sound waves in the gas, the agglomerates are broken up and a smoke or aërosol is formed of the particles equal in fineness to those produced during the grinding of the catalyst granules. In our experimentation, we have produced jets of gas traveling at high linear velocity by forcing the gas under high pressure through an orifice of small diameter so that a pressure drop of 2 to 10 atmospheres is produced across the orifice by dropping or introducing the agglomerated particles of finely divided catalysts into the gas. As the gas issued through the orifice and contacted the agglomerates of catalyst, these were broken up and a finely dispersed "aërosol" or smoke was formed of the particles equal in size to their original state when produced by grinding such as about one micron in diameter. The contact of the gas with the catalyst at velocities below that of sound turbulence in the jet caused the formation of a smoke from the more loosely held particles but the disintegrating action of the gas was not sufficiently intense to completely break up and disintegrate the agglomerates of the catalyst.

While it is highly important that the velocity of the gas be extremely high and particularly greater than that of sound at the point of contact with the agglomerated particles of finely ground catalyst, it is unnecessary that this high velocity be maintained after the high velocity gases have contacted and disintegrated the catalyst. As soon as the agglomerates have been disintegrated by the "shock wave" action of the high velocity gas, they are immediately broken up and dispersed, forming the smoke or "aërosol" and the disintegrated catalyst particles will remain dispersed in the gas until separated therefrom. Thus, it is another object of our invention to subject agglomerated particles of finely divided catalyst to the action of a gas travelling at a velocity greater than that of sound waves and thereby disintegrating the agglomerated particles of catalysts into their original finely ground size. A further object of our invention is to pass the gas or vapor to be treated at a velocity greater than that of sound and contact the gas with a finely ground but agglomerated catalyst and thereby disintegrating the agglomerated particles of the catalyst and suspending the catalyst in the gas in a finely divided state and then subjecting the suspension of the gas and catalyst to desired reaction conditions.

Another object of our invention is to pass gas under a high pressure, greater than 2 to 10 atmospheres through a small orifice into a zone of such lower pressure so that a velocity greater than that of sound is obtained on the gas issuing from the orifice, then immediately contacting said high velocity gas with a finely ground but agglomerated catalyst and thereby disintegrating the catalyst and dispersing it in the gas and subjecting the catalyst gas mixture to reaction conditions.

Further objects, features and advantages of our invention will be apparent from the following description taken from the drawing which represents a diagrammatic flow sheet of one method for carrying out our invention which is to be considered as merely illustrative and not as limiting our invention.

In the drawing, the catalyzing and catalyst separating apparatus is housed in a suitably heated or insulated jacket 10. The gas or vapor to be treated is passed via line 11 through heater 12 where it is heated to a suitable temperature and then passed via line 14 to blower 15 which forces the gas or vapor through line 16 under a pressure greater than 2 to 10 atmospheres through orifice or jet 17 into section 18' of the catalyzing tube 18. If desired, the gas may be passed through the blower and then through the heater into the catalyzing tube in order to prevent the blower from handling hot gases. The gas or vapor traveling at high velocity through the orifice 17 contacts finely ground but agglomerated catalyst issuing from nozzle 19 and forces the catalyst through venturi 20 through the enlarged and elongated reaction chamber 18 which may be heated if required. The chamber 18 is of sufficient length and capacity to permit the desired reactions to take place. If desired, the throat of the venturi may be placed directly below the nozzle 19 or to the right of the nozzle. The aspiration effect of the gas passing through the section 18' aids in drawing the catalyst into this section.

As stated heretofore, the drop in pressure of the gases from 2 to 10 atmospheres by passing through orifice 17 imparts a high velocity to the gases which when contacting the finely divided but agglomerated catalyst in section 18' rapidly disintegrates the agglomerates forming a smoke of the gas with the catalyst which then passes through the reaction chamber 18 without causing any separation of the catalyst from the gas.

The rate of flow of the hot gas through the reaction zone is so regulated as to maintain the smoke of gas and catalyst in the reaction zone for the required length of time necessary to effect the desired reactions.

Following the catalytic reactions in the chamber 18, the treated gases or vapors and the suspended catalyst are passed into a separating zone 22 in a chamber 21. A pipe or tubing 23 depends into the separating zone 22 and causes the relatively narrow stream of gases leaving the reaction chamber 18 and passing through the zone 22 to be directed downward in the chamber 21 for settling out of as much of the catalyst as possible from the treated gases. The cross-sectional area of the chamber 21, both in the zone 22 surrounding the depending tube 23 and that portion of the zone indicated at 22' below the tube 23, is such with respect to the cross-sectional area of the reaction chamber 21 as to produce with respect to movement in chamber 18, a relative quiescence in both sections of zones 22 and 22', thereby facilitating the settling of the catalyst. From the lower enlarged portion or settling zone 22', the gases together with any remaining unsettled catalyst pass upwardly through the tube 23 into a third separating zone 24 which also has a cross-sectional area with respect to the cross-sectional area of chamber 18 to effect a lower velocity and permit catalyst settling.

To insure substantially complete settling or precipitation of catalyst from the gases, zone 24 is preferably in the form of the well known Cottrell electrical precipitator or similar precipitator adapted to separate solids from gases. Here an electrode 25 is suspended in the center of the chamber or zone 24 to co-operate with a surrounding electrode 26 or the like and develop an electrostatic charge according to the well known phenomena with the result that the charged catalyst particles drop out or are precipitated, the treated gases passing on out of the system through the tube 23 for further treatment if desired and eventual recovery. As was above indicated, the diameter of this zone is such with respect to the velocity of gas as to permit the precipitated and agglomerated particles to drop out of the gas stream and settle through the lower portion of zone 22' into the bottom of the chamber 21, the lower end of which communicates with nozzle 19. The lower portion of chamber 21 may contain any type of means such as is generally indicated by an agitator 27 for breaking up resultant agglomerated catalyst masses to reduce them to smaller particles.

Where the catalyst requires regeneration before reuse, it may be entirely or partly withdrawn from the chamber 21 to a catalyst regenerator 28 as by means of conveyor 29 or the like, regenerated as by means of heat, oxygen, air and/or steam or other necessary or preferred regenerating treatment, and returned to the catalyst settling chamber 21 as by means of a conduit and screw conveyor 30.

According to the invention the catalyst powder should be very fine, preferably of less magnitude than the mean free path of the activated molecules of gas at reaction temperature. By using such finely divided catalyst, the nascent products of reaction are more readily removed from the sphere of catalytic influence and are not so likely to undergo secondary reactions. The catalyst preferably should be uniform in size to insure uniform travel and avoid tendencies of larger particles to settle out where the catalyst is being carried along in the gas or vapor stream in which case, as has been indicated, the velocity and turbulence must be sufficient to keep the catalyst in suspension especially since the volume of catalyst required ordinarily will be large. The catalyst of course should remain at reaction temperature at all times, at least when in contact with the gases or vapors to be treated.

Any apparatus of the general type indicated which will mix the finely powdered catalyst with a gas or vapor stream undergoing treatment, maintain the catalyst in suspension during treatment and effect separation of the catalyst from the treated gases or vapors is within the range of use of the present invention, and likewise, any such apparatus including provision for the return of the separated catalyst to the circuit is within the range of the present invention.

The following is submitted as illustrative of the value of the present invention:

Isobutane gas heated to a temperature of 850° F. was passed under a pressure of 10 atmospheres through an orifice of 0.0135 inch in diameter into a reaction zone maintained at atmospheric pressure. As soon as the gas passed through the small orifice, it contacted agglomerates of a catalyst composed of equal molal proportions of zinc and zirconium oxides which had been ground finer than one micron in diameter. The contact of the gas with the agglomerates of the catalyst broke up these agglomerates, forming a smoke of the catalyst in the gas. The smoke was passed through a reaction zone and thence into a separating zone where the catalyst was separated from the treated gas. Under these conditions of operation, approximately 17% of the isobutane was converted into isobutene and hydrogen. Approximately 70 liters of gas per hour per 5 grams of catalyst was thus treated and the catalyst was good for over 5 hours use before regeneration by burning out, was necessary.

In order to compare the effectiveness of this method of catalytic treatment, isobutane gas at 90° F. was passed through 5 grams of granular mixture of zinc oxide and zirconium oxide in equal molar proportions. In order to obtain a conversion of about 17% of the isobutane, it was necessary to reduce the flow rate to about 10 liters per hour and the active life was only about one hour.

While the above process has been described particularly in connection with catalytic treatment of gases for the purpose of dehydrogenation, it is obvious that the same process may be used for other heat treatment or conversion of hydrocarbons including gasoline reforming operations wherein the materials are modified chemically to increase their anti-knock value as well as cracking operations adapted to convert heavier petroleum hydrocarbons to yield hydrocarbons in the gasoline range.

The method for dispersing or disintegrating finely ground but agglomerated powders is also applicable for purposes other than catalytic treatment. For example, such fungicides and insecticides as sulfur, lead arsenate, etc., may be dispersed in the air or other gas to form a smoke by subjecting the agglomerated particles of finely ground insecticides to the action of a high velocity gas, such as air, traveling at a linear velocity greater than that of sound in order to disintegrate the insecticide and form a smoke or aerosol which may be directed at the object or trees to be dusted with the insecticide.

The above description is not to be taken as limiting our invention but merely as illustrative of one mode of carrying it out as many variations may be made thereon as will be recognized by those skilled in the art which are within the scope of the following claims:

We claim:

1. A method for the catalytic treatment of a gas or vapor which comprises passing a gas or vapor at a velocity greater than the velocity of sound in said gas in contact with a finely powdered catalyst which has become agglomerated and thereby breaking the agglomerates of said catalyst to produce subdivided catalyst particles of original fineness suspended in said gas or vapor, subjecting said mixture to reaction conditions, and separating the finely powdered catalyst from said treated gas or vapor.

2. A method for the catalytic treatment of gases and vapors which comprises generating a velocity in a gas, which velocity is greater than that of sound waves in said gas, commingling said gas or vapor with a finely powdered catalyst which has subsequently become agglomerated and thereby reducing said catalyst substantially to its original fine state of subdivision, passing the mixture of the catalyst and gases or vapors through a reaction zone at an elevated reaction temperature to obtain catalytic treatment of said gases or vapors in the presence of said catalyst and separating the catalyst from said treated gases or vapors.

3. A method for the catalytic treatment of gases and vapors which comprises passing a gas under pressure through an orifice into a zone of approximately atmospheric pressure to increase the velocity of said gas to a value greater than the velocity of sound in said gas, introducing finely ground particles of catalyst which have subsequently become agglomerated into said gas traveling at a velocity greater than sound, passing the mixture of gas and catalyst into a reaction zone at a lower velocity and thereby allowing sufficient time for reaction of said gas in the presence of said catalyst, and separating the catalyst from the treated gas.

WALTER F. HUPPKE.
THEODORE VERMEULEN.

CERTIFICATE OF CORRECTION.

Patent No. 2,364,145. December 5, 1944.

WALTER F. HUPPKE, ET AL.

It is hereby certified that error appears in the printed specification of the above numbered patent requiring correction as follows: Page 3, first column, line 14, for "molal" read --molar--; line 32, for "90° F." read --900° F.--; and that the said Letters Patent should be read with this correction therein that the same may conform to the record of the case in the Patent Office.

Signed and sealed this 9th day of October, A. D. 1945.

Leslie Frazer (Seal) First Assistant Commissioner of Patents.